US005442547A

United States Patent [19]

Kutsumi et al.

[11] Patent Number: 5,442,547

[45] Date of Patent: Aug. 15, 1995

[54] APPARATUS FOR AIDING A USER IN PRODUCING A DICTIONARY STORING MORPHEMES WITH INPUT CURSOR PREPOSITIONED AT CHARACTER LOCATION WITH THE HIGHEST PROBABILITY OF CHANGE

[75] Inventors: Takeshi Kutsumi, Yamatokouriyama; Tokuyuki Hirai, Nara, both of Japan

[73] Assignee: Sharp Kabushiki Kaisha, Osaka, Japan

[21] Appl. No.: 6,759

[22] Filed: Jan. 21, 1993

[30] Foreign Application Priority Data

Jan. 22, 1992 [JP] Japan .................................. 4-009521

[51] Int. Cl.[6] .............................................. G06F 17/00

[52] U.S. Cl. ........................... 364/419.08; 364/419.02; 364/419.07; 364/419.04

[58] Field of Search ....................... 364/419.01, 419.02, 364/419.07, 419.04, 419.08; 395/200

[56] References Cited

U.S. PATENT DOCUMENTS 4,633,435 12/1986 Morimoto et al. .................. 364/419
4,724,523 2/1988 Kucera ................................ 364/419
5,005,127 4/1991 Kugimiya et al. .................. 364/419

FOREIGN PATENT DOCUMENTS 1129355 5/1989 Japan .

*Primary Examiner*—Gail O. Hayes
*Assistant Examiner*—Khai Tran

[57] ABSTRACT

An apparatus for aiding adding to a dictionary words which take various forms such as irregular verbs, phrasal expressions, etc. includes: a unit for obtaining the original form of a target word which a user desires to add to the dictionary; a unit for receiving variants of the target word input by the user from a prescribed input region; a manually operable input unit for editing, at a cursor position, a character string displayed on the input region; a unit for displaying the original form on the input region and positioning the cursor at a character location with the highest possibility that the original form and a variant form are different, prior to receiving the variant; and a unit for storing the original form and the variant in association with each other into a user dictionary. A language processing apparatus including such an apparatus for aiding adding to a dictionary is also disclosed. When the user inputs the original form of a word to the apparatus, the original form is displayed on the input region prior to inputting its variant form. The cursor is positioned at the character location of the original form which has the highest possibility of being different from the variant form. Thus the labor of adding various forms of the same word into the dictionary is reduced.

18 Claims, 14 Drawing Sheets

| ENTRY | PART OF SPEECH | FLECTION | THIRD PERSON SINGULAR PRESENT (PLURAL FORM) | PAST FORM | PAST PARTICIPLE | PRESENT PARTICIPLE | TRANSLATION |
|---|---|---|---|---|---|---|---|
| a | ARTICLE | | | | | | ひとつの |
| come | VERB | 0 | comes | came | come | coming | 来る |
| pen | NOUN | 1 | | | | | |

EXAMPLE ( This is a pen. )

BUFFER A ----ORIGINAL BUFFER

| | | | | | | | |
|---|---|---|---|---|---|---|---|
| t | h | i | s | | | | |
| i | s | | | | | | |
| a | | | | | | | |
| p | e | n | | | | | |
| | | | | | | | |

BUFFER B ----PART OF BUFFER AS RESULT OF DICTIONARY LOOK UP

| | | | |
|---|---|---|---|
| this — — | PRONOUN | DEMONSTRATIVE ADJECTIVE | |
| is — — | VERB | | |
| a — — | ARTICLE | | |
| pen — — | NOUN | | |

BUFFER C ----BUFFER FOR RESULT OF SYNTACTIC ANALYSIS

BUFFER D ---- BUFFUR FOR RESULT OF TREE CONVERSION

BUFFER E ---- OUTPUT SENTENCE BUFFER

これはペンである。

| | THIRD PERSON SINGULAR PRESENT | PAST | PAST PARTICIPLE | PRESENT PARTICIPLE |
|---|---|---|---|---|
| 1 | -s | -ed | -ed | -ing |
| 2 | -s | e-ed | e-ed | e-ing |
| 3 | -s | **ed | **ed | **ing |
| 4 | -es | -ed | -ed | -ing |
| 5 | y-ies | y-ied | y-ied | -ing |
| 6 | -s | - | -en | -ing |
| 0 | OTHERS | | | |

SELECT FLECTION PATTERN. _

| | |
|---|---|
| INPUT. | THIRD PERSON SINGULAR, PRESENT |
| forget_ | TENSE FORM |

FIG.18

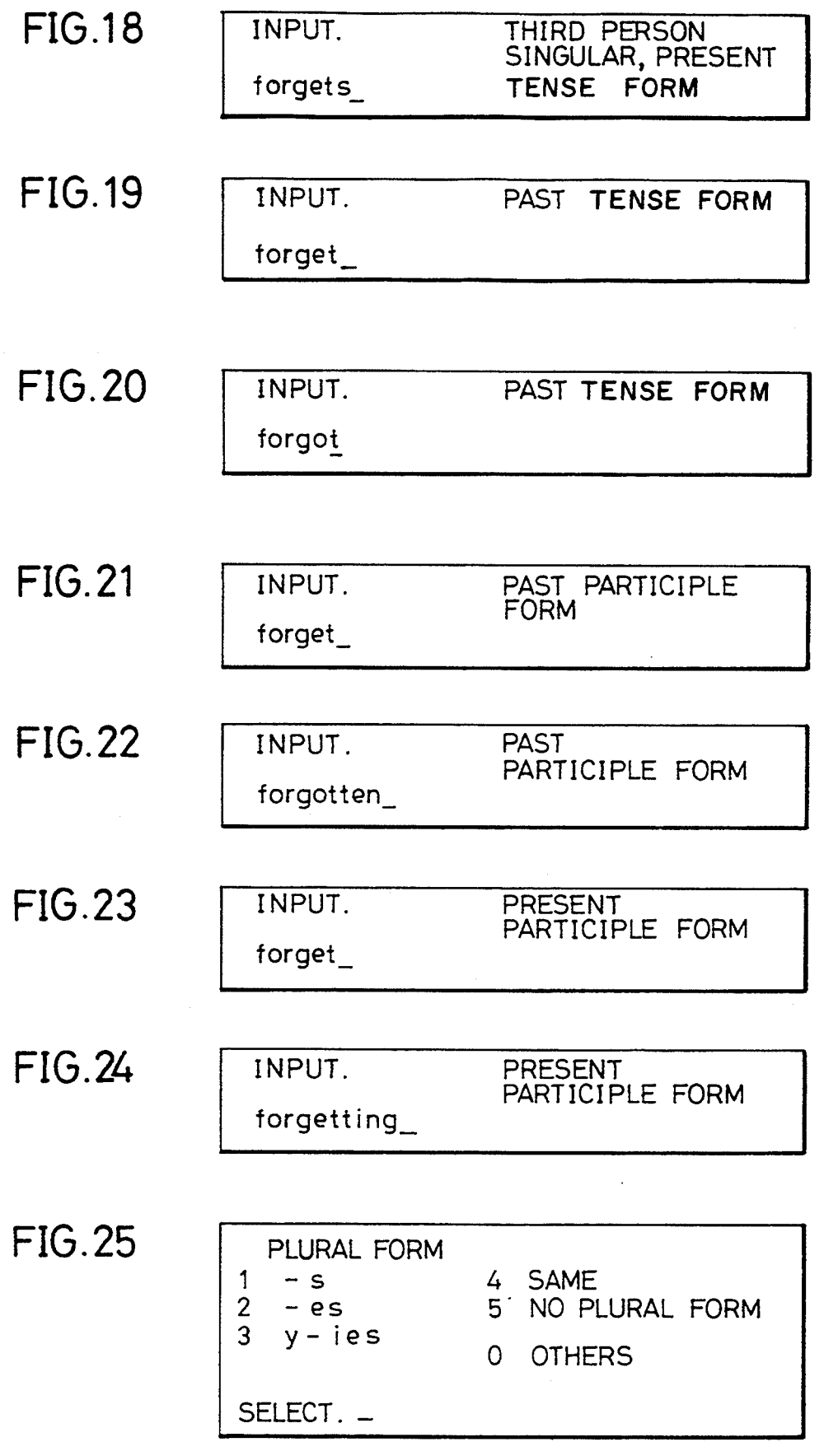

| | |
|---|---|
| INPUT. | THIRD PERSON SINGULAR, PRESENT |
| forgets_ | TENSE FORM |

FIG.19

| | |
|---|---|
| INPUT. | PAST TENSE FORM |
| forget_ | |

FIG.20

| | |
|---|---|
| INPUT. | PAST TENSE FORM |
| forgot | |

FIG.21

| | |
|---|---|
| INPUT. | PAST PARTICIPLE FORM |
| forget_ | |

FIG.22

| | |
|---|---|
| INPUT. | PAST PARTICIPLE FORM |
| forgotten_ | |

FIG.23

| | |
|---|---|
| INPUT. | PRESENT PARTICIPLE FORM |
| forget_ | |

FIG.24

| | |
|---|---|
| INPUT. | PRESENT PARTICIPLE FORM |
| forgetting_ | |

FIG.25

PLURAL FORM

| | |
|---|---|
| 1 -s | 4 SAME |
| 2 -es | 5 NO PLURAL FORM |
| 3 y-ies | 0 OTHERS |

SELECT. _

FIG. 26

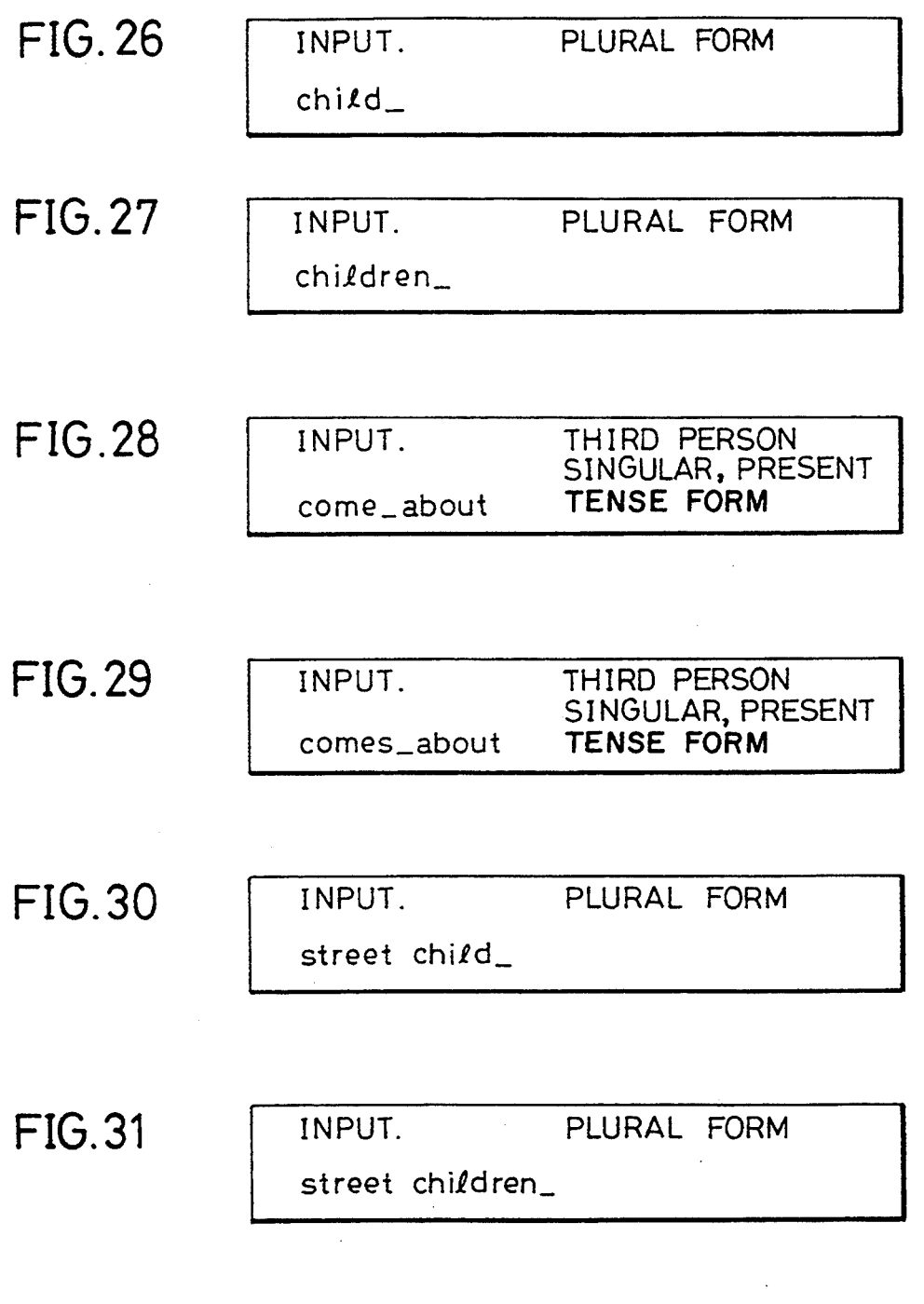

| | |
|---|---|
| INPUT. | PLURAL FORM |
| child_ | |

FIG. 27

| | |
|---|---|
| INPUT. | PLURAL FORM |
| children_ | |

FIG. 28

| | |
|---|---|
| INPUT. | THIRD PERSON SINGULAR, PRESENT |
| come_about | **TENSE FORM** |

FIG. 29

| | |
|---|---|
| INPUT. | THIRD PERSON SINGULAR, PRESENT |
| comes_about | **TENSE FORM** |

FIG. 30

| | |
|---|---|
| INPUT. | PLURAL FORM |
| street child_ | |

FIG. 31

| | |
|---|---|
| INPUT. | PLURAL FORM |
| street children_ | |

APPARATUS FOR AIDING A USER IN PRODUCING A DICTIONARY STORING MORPHEMES WITH INPUT CURSOR PREPOSITIONED AT CHARACTER LOCATION WITH THE HIGHEST PROBABILITY OF CHANGE

BACKGROUND OF THE INVENTION

1. Field of the Invention

The present invention relates generally to language processing apparatuses equipped with dictionaries, and more specifically, to a function of aiding a user in producing a dictionary and an apparatus therefor in a language processing apparatus for aiding a user in producing a part of the dictionary.

2. Description of the Related Art

Language processing apparatuses in practical use at present include word processors for aiding a person in making documents, translating machines for translating a document written in a language into another language and the like. These language processing apparatuses are provided with dictionaries stored with information depending upon their respective objects. The term dictionary used herein indicates systematic arrangement in which a number of unit items each formed of an entry and various sets of information associated thereto are integrated so that a desired item can easily be retrieved utilizing its entry. The dictionary is principally stored in a machine-readable non-volatile medium in a machine-readable manner.

Work efficiency greatly decreases if there exists a word in a document to be processed or produced by a user utilizing such a language processing apparatus, which word is not included as an entry in a dictionary equipped to the apparatus. However, if too many words are prestored in the dictionary, the necessary amount of memory will be too large, thereby slowing down the processing speed. Accordingly, to cope with such a situation, a language processing apparatus of this kind generally has a "function of producing a user dictionary". The user dictionary is produced in the language processing apparatus by the user by inputting entries and associated information. When the language processing apparatus executes a language processing, the apparatus uses the user dictionary together with the dictionary originally equipped.

It is assumed that the method of using words to be registered in a user dictionary is regular. More specifically, assume that all the words to be registered are utilized based on a pattern defined by the grammatical theory of a language to be used. In such a case, the number of variant patterns is limited. Accordingly, the contents to be registered in the user dictionary include a word to be registered, its part of speech, and information designating one of a limited number of inflection patterns present in the language to which the inflection pattern of the word belongs to. More specifically, in this case, it is not necessary to register all the forms the word actually takes in various grammatical conditions. Many forms may be produced utilizing the language processing function of the language processing apparatus based on one form decided as the original form of the word, its part of speech, and its inflection pattern.

If inflection of a word to be registered in a user dictionary is irregular, however, simple registration as described above would not be sufficient. In this case, the contents to be registered include the original form of the word, its part of speech, and all the forms the word actually takes in various grammatical conditions. The user must input all the information.

Consider that a language to be used is English. If the part of speech of a word to be registered is a verb, there are, as variants to be input besides the original form, the third person singular present form, the past form, the past participle, and the present participle. Therefore, five kinds of forms altogether must be input for one verb.

Assume that a word to be registered in a user dictionary is a phrasal expression. Hereinafter, a "phrasal expression" means an expression which consists of a plurality of words which appear to be a plurality of words but is treated en bloc as a single word in function. When a phrasal expression is to be registered in a user dictionary, it is a convenient and usual practice to register them as a single word. In this case, if the entire phrasal expression irregularly changes, the portions to be changed are determinate depending upon languages. For example, assume that a language to be used is English. If the part of speech of a phrasal expression is verb, the head word among the group of words constituting the phrasal expression is most likely to change. Meanwhile, if the part of speech of the compound word is noun, the last word among the group of words constituting the phrasal expression is most likely to change. However, despite such linguistic characteristics, in a function of producing a user dictionary in a conventional language processing apparatus, phrasal expressions are treated in the same way as usual words, and in the case of English verbs, for example, five kinds of forms for each irregular verb must be input.

Therefore, in a function of producing a user dictionary in a conventional language processing apparatus, a problem is encountered that user inconvenience in registering words with irregular variants and phrasal expressions cannot be alleviated.

SUMMARY OF THE INVENTION

It is therefore an object of the invention to provide a language processing apparatus and a dictionary producing aiding apparatus alleviating user inconvenience in registering words changing in various ways in a dictionary.

Another object of the invention is to provide a language processing apparatus and a dictionary producing aiding apparatus allowing registration of phrasal expressions with reduced work load as is the case with words changing in a various ways.

A still further object of the invention is to provide a language processing apparatus and a dictionary producing aiding apparatus alleviating user inconvenience in registering various forms of a word changing irregularly in a dictionary.

An additional object of the invention is to provide a language processing apparatus and a dictionary producing aiding apparatus allowing a reduction of necessary processing needed by a user in registering various forms of a word changing irregularly in a dictionary.

Yet another object of the invention is to provide a language processing apparatus and a dictionary producing aiding apparatus allowing a reduction in the frequency of moving input positions as compared to the conventional apparatus in registering various forms of words changing irregularly in a dictionary.

A language processing apparatus according to the invention includes a unit for performing a grammatical processing including at least morphological analysis to sentences in a prescribed first language to be input, a dictionary usable in morphological analysis and recorded in a machine-readable manner to a machine-readable storage medium for storing morphemes in said first language, and a unit for aiding a user in producing a part of the dictionary. The unit for aiding the user in producing a part of the dictionary includes a unit for obtaining a first form of a target morpheme which the user desires to make the dictionary store, a unit for receiving a second form of the target morpheme to be input by the user from a prescribed input region, a manually operable input unit for editing a character string displayed in the prescribed input region at an position which can be moved, a unit for displaying the first form on the prescribed input region prior to receiving a second form and for positioning the input position to a position with the higher possibility that the first form is different from the second form, and a unit for storing the first form and the second form associated with each other into the user dictionary.

When the user inputs the first form to the apparatus, the first form is displayed on in the input region prior to inputting the second form. The input position is positioned to a location of the first form most likely to be different from the second form. The probability that the input position must be manually moved to the change location is thus decreased. Consequently, the work load of the user in registering various forms of the same word into the dictionary is reduced.

A still further object of the invention is to provide a language processing apparatus and a dictionary producing aiding apparatus allowing reducing the frequency of moving an input position as compared to conventional apparatus, in registering into a dictionary various forms of a word changing irregularly.

In a language processing apparatus including a dictionary usable in morphological analysis and stored in a machine-readable storage medium for storing morphemes in a prescribed language, an apparatus for aiding in the producing of a dictionary according to another aspect of the invention is used for aiding a user in producing a part of the dictionary. The apparatus includes a unit for obtaining a first form of a target morpheme which the user desires to make the dictionary store, a unit for receiving a second form of the target morpheme input by the user on a prescribed input region, a manually operable input unit for editing a character string displayed on a prescribed input region at an input position which can be moved, a unit for displaying the first form in the prescribed input region prior to receiving the second form and positioning the input position to a location with the highest probability where the first form and the second form are different, and a unit for storing the first form and the second form in association with each other in the user dictionary.

When the user inputs the first form to the apparatus, the first form is displayed in the input region prior to input of the second form. The input position is positioned to a location of the first form where the first form is most likely to be different from the second form. Thus, the probability that the input position must be manually moved to a change location is reduced. Consequently, the user work load in registering various forms of the same word into the dictionary is reduced.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 15 is a flow chart showing a noun registration processing;

FIG. 16 is a representation schematically showing an example of a table display box when selecting a variant of a verb;

FIGS. 17 and 18 are views each schematically showing a box for inputting a third person singular present tense form;

FIGS. 19 and 20 are views each schematically showing a box for inputting the past tense form of a verb;

FIGS. 21 and 22 are views each schematically showing a box for inputting the past participle form of a verb;

FIGS. 23 and 24 are views each schematically showing a box for inputting the present participle form of a verb;

FIG. 25 is a schematic representation of a box showing a list of variations of plural forms of nouns;

FIGS. 26 and 27 are representations each schematically showing a box for inputting the plural form of a noun;

FIGS. 28 and 29 are representation each schematically showing a box for inputting the third person singular, present tense form of a phrasal verb; and FIGS. 30 and 31 are representations each schematically showing a box for inputting the plural form of a phrasal noun.

DESCRIPTION OF THE PREFERRED EMBODIMENTS

Now, a translating machine will be described as one embodiment of a language processing apparatus according to the invention. However, the invention is not limited to such a translating machine, but is also applicable to word processors or the like.

Figure 1:
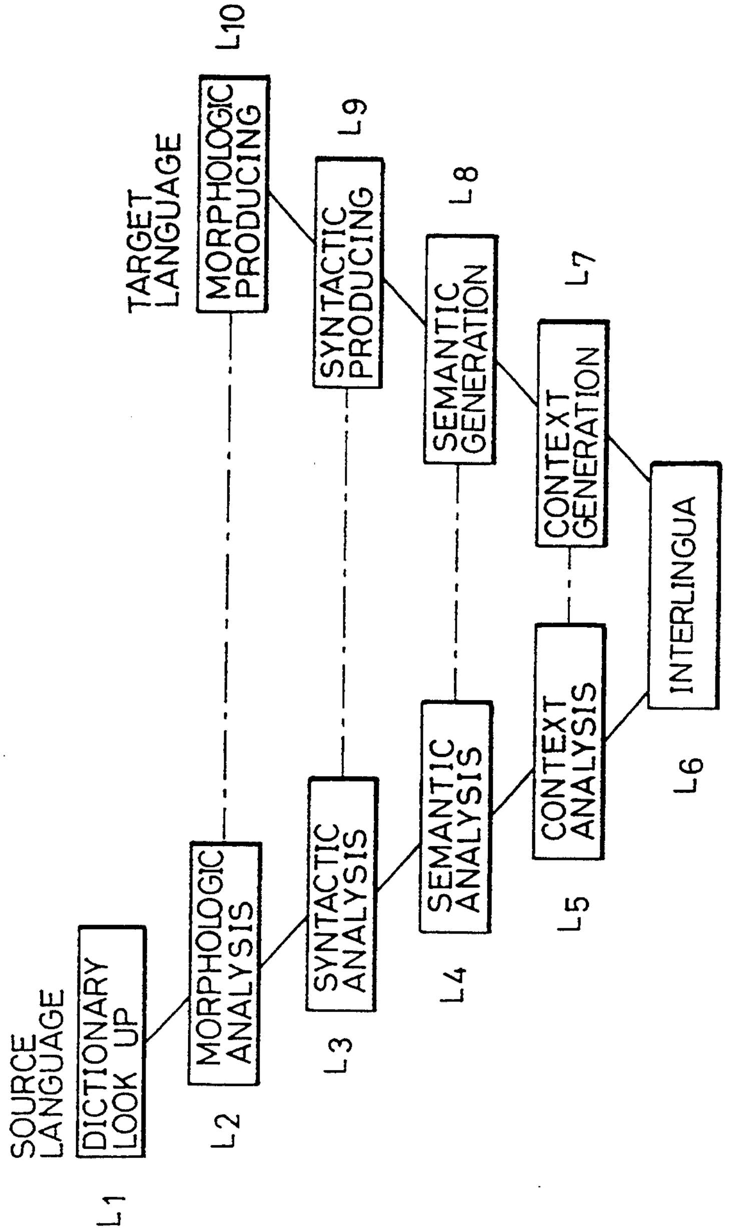
FIG. 1 is a representation schematically showing the concept of machine translation.

Before describing the embodiments, the concept of machine translation will be summarized. Referring to FIG. 1, an analyzing processing performed in machine translation goes through various analysis levels. In machine translation, when a source language sentence displayed on the upper left in FIG. 1 is input, processings of various levels are sequentially performed and a target language sentence displayed on the right side in FIG. 1 is eventually obtained. If, for example, a source language sentence is input, processings proceed starting from a dictionary look up processing (level L1) to a morphological analyzing processing of (level L2), then a syntactic analysis processing of (level L3), . . . , and finally a morphologic producing processing of level L10 is performed, thereby generating a target language sentence.

Machine translation is roughly divided into the following two kinds depending upon up to which level the analyzing processing is performed. One is a pivot method by which analyzing is performed as far as an intermediate language (so called "interlingua") displayed in level L6, and a target language sentence is produced therefrom. The other is a transfer method by which analyzing is performed to any of the above-stated levels L2–L5 to provide the internal structure of a source language sentence, then the internal structure obtained is converted into the internal structure of a target language in the same level as the internal structure of the source language, and then the target language sentence is produced.

An interlingua used in the pivot method is a concept which does not depend on a source word or a target word. Accordingly, once the interlingua is obtained by a single analyzing processing of the source language, a plurality of words can be produced from this interlingua, which is advantageous for translating between a number of languages. However, according to such pivot method, it is uncertain if the intermediate word, which is the essential concept of the method, can really be obtained.

The transfer method is a compromise approach to cope with such a problem associated with the pivot method, and today, many systems adopt the transfer method. The following description concerns the transfer method, and a translating machine in accordance with the embodiment which will be described later also employs the transfer method.

Now the content of each analyzing processing shown in FIG. 1 will be described.

(1) Dictionary Look Up, Morphologic Analyzing

In this processing, a processing of dividing an input sentence into morpheme strings (word strings) utilizing, for example, a longest coincidence method while referring to a dictionary which stores morphemes. Then, grammatical information such as the part of speech of each of the obtained words and a translation for each word are provided, and then a processing of analyzing tense/person/number, etc is performed.

(2) Syntactic Analyzing

In this processing, a processing of constructing and determining the structure (parsing tree) of the sentence such as the relation between words is performed based on the part of speech/variant. In this processing, a determination whether or not the obtained structure of the sentence represents correct meaning is not performed.

(3) Semantic Analyzing

What is correct and what is not correct in terms of meaning are determined among a plurality of parsing trees obtained as a result of the syntactic analyzing processing, and a processing of adopting only the correct one is performed.

(4) Context Analyzing

In a context analyzing processing, the topic of the input sentence is comprehended, and a processing of removing an omitted part and ambiguity included in the input sentence is performed.

Figure 2:
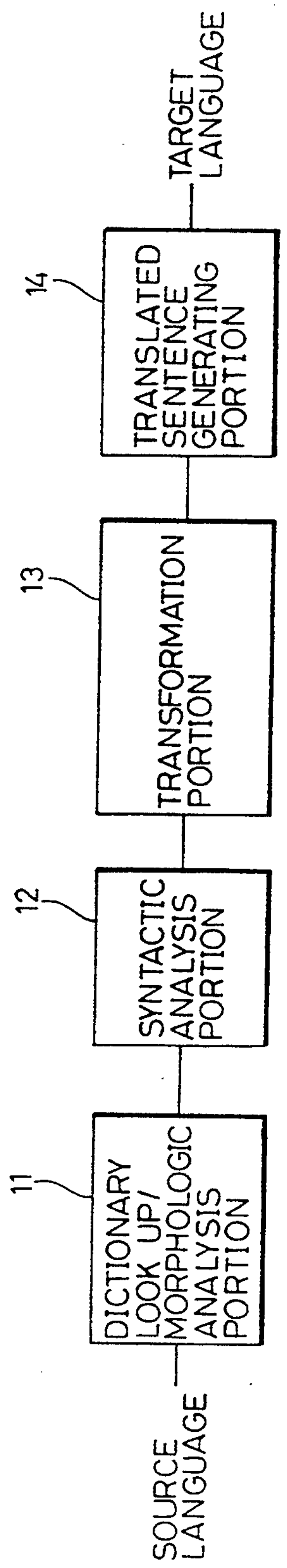
FIG. 2 is a representation schematically showing the construction of machine translation in accordance with a transfer method.

In the translation module of the translating machine in accordance with one embodiment of the invention which will be described later, it is assumed that analyzing processing is performed as far as level L3. More specifically, the translation module of the translating machine in accordance with the embodiment has a structure shown in FIG. 2. The translation module as illustrated in FIG. 2 includes a dictionary look up/morphologic analyzing portion 11 for performing a dictionary look up/morphologic analyzing processing to a source language text, a syntactic analyzing portion 12 for performing a syntactic analyzing processing to an input sentence which has been morphologic-analyzed, a transformation portion 13 for generating the parsing tree of a target language by transforming the result of the syntactic analysis, and a translated sentence generating portion 14 for generating a translated sentence in the target language based on the parsing tree of the target language generated by transformation portion 13. Processings performed in portions 11–14 will be described in detail in conjunction with the embodiment.

Figure 3:
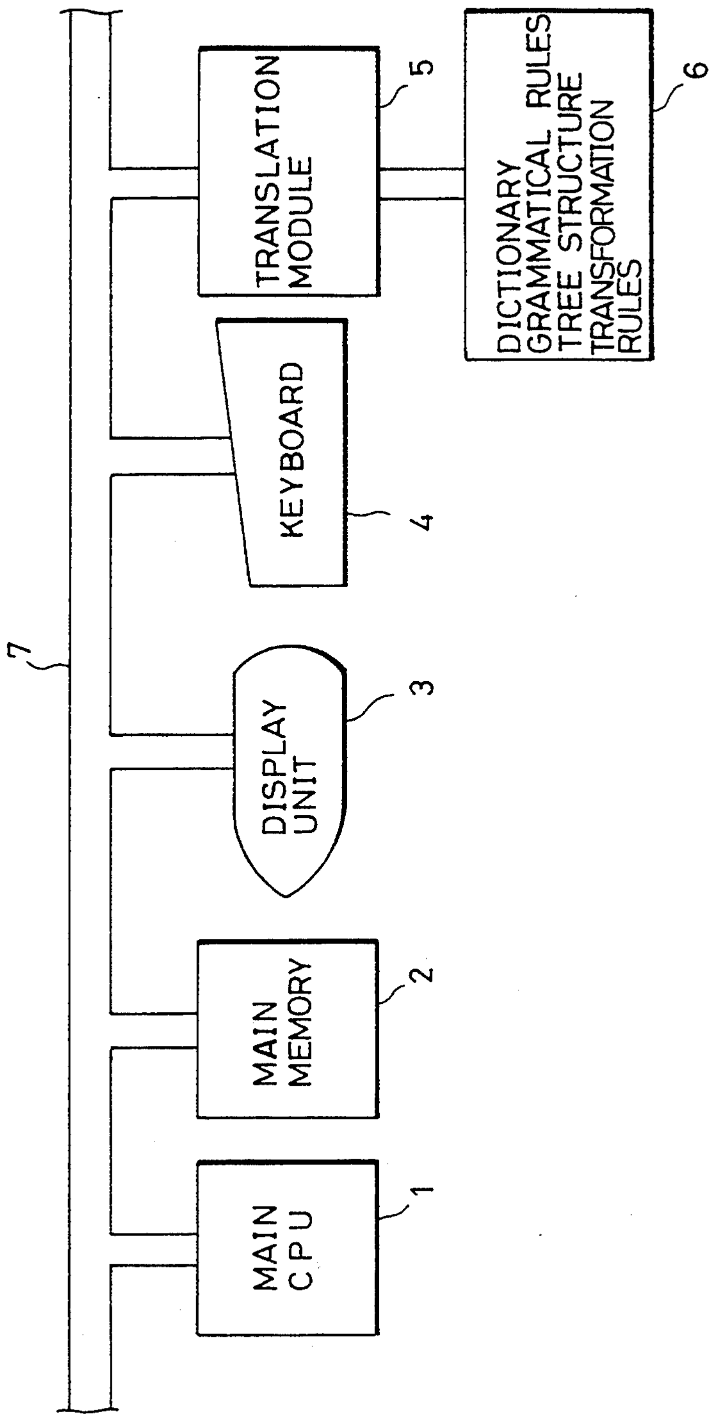
FIG. 3 is a block diagram showing a translating machine in accordance with one embodiment of a language processing apparatus of the invention.

FIG. 3 is a block diagram showing the translating machine in accordance with the embodiment of the language processing apparatus of the invention. Referring to FIG. 3, the translating machine includes a main CPU (Central Processing Unit) 1, a bus 7 to which main CPU 1 is connected, a main memory 2 connected to bus 7, a display unit 3 formed of a CRT (Cathode Ray Tube), an LCD (Liquid Crystal Display) or the like connected to bus 7, a keyboard 4, a translation module 5 connected to bus 7, and a memory 6 which stores knowledge base such as a dictionary/grammatical rules and tree transformation structure rules for translation connected to translation module 5.

Figure 4:
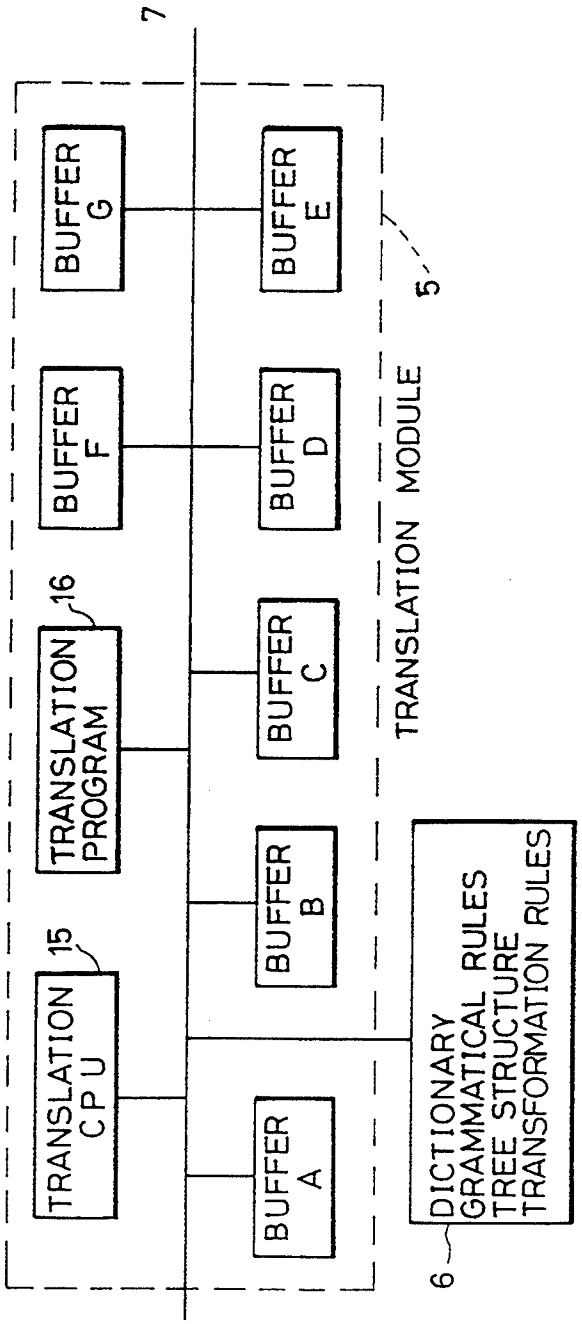
FIG. 4 is a block diagram showing in detail a translation module 5 shown in FIG. 3.

When a sentence in a source language is input, translation module 5 outputs a target language by translating the sentence in a prescribed procedure. Referring to FIG. 4, translation module 5 includes a translation CPU 15 connected to bus 7 for translating a source language sentence (English in this embodiment) input through bus 7 in accordance with a prescribed translation program and outputting the translated result as a target language sentence (Japanese in this embodiment) to bus 7, a translation program memory 16 for storing translation programs executed in translation CPU 15, a buffer A for storing the original of the input source language on a word-by-word basis, a buffer B for storing information such as the part of speech or a translation for each word obtained by referring to the dictionary included in memory 6, a buffer C for storing information concerning the parsing tree of source language sentence, a buffer D for storing the parsing tree of target language which is generated by transforming the parsing tree of the source language stored in buffer C, a buffer E for storing sentences rearranged in a Japanese style by adding appropriate particle and auxiliary verb to the parsing tree of Japanese stored in buffer D, and buffers F and G used for user dictionary registration by a user.

Figure 5:
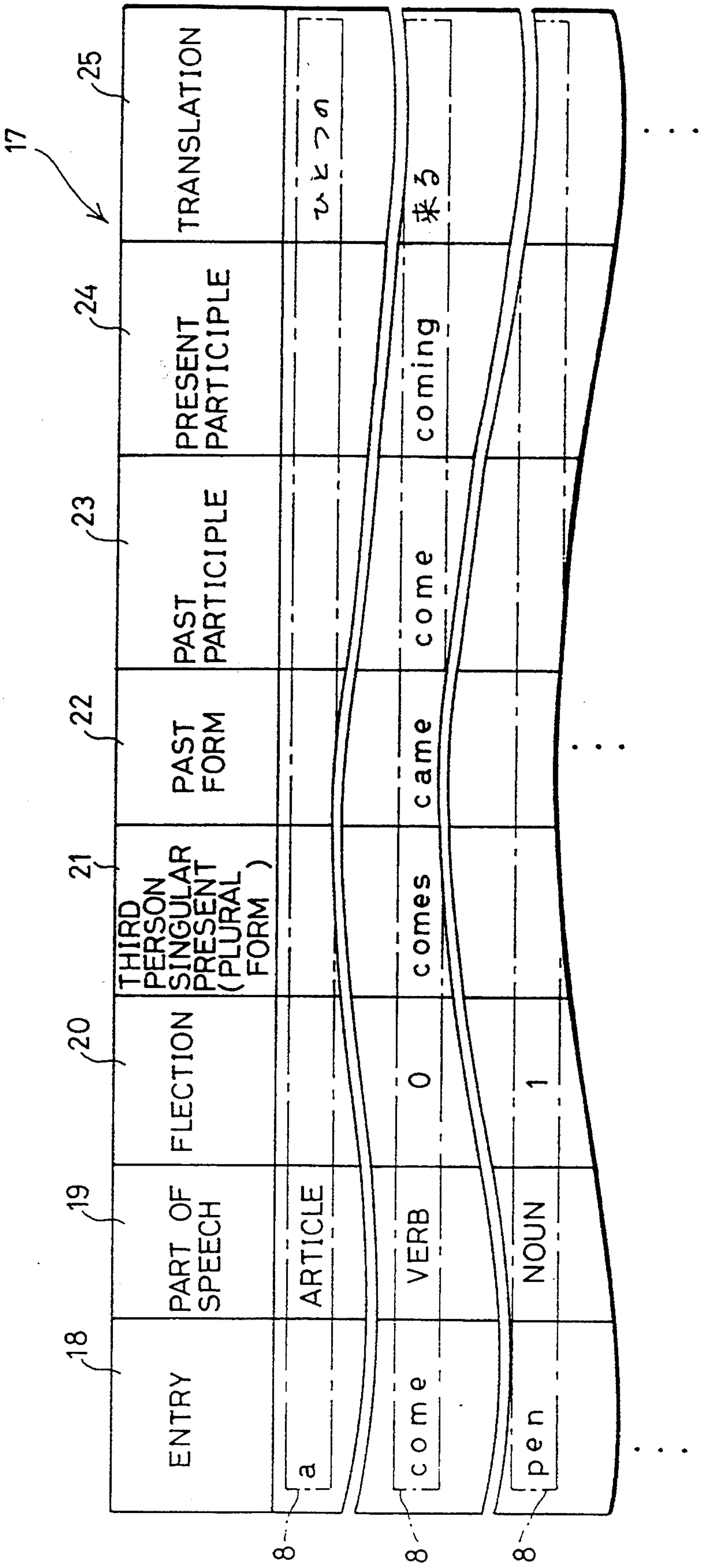
FIG. 5 is a schematic representation showing the contents of a dictionary.

Referring to FIG. 5, a dictionary 17 in memory 6 (see FIG. 4) stores a large number of items 8 which associate each morpheme with its grammatical information. Each item 8 includes an entry field 18, a part-of-speech field 19 for storing information concerning the part-of-speech of the entry 18, a inflexion field 20 for when the entry 18 changes like a noun or a verb, storing information of prescribed regular patterns or if the pattern changes irregularly for indicating the pattern is irregular one, a third person singular present field 21, when the entry is a verb or a noun which undergoes irregular change, for storing the third person singular present or third person present plural form of the entry, fields 22, 23, 24, when the entry is a verb which irregularly changes, for storing the past, the past participle form, and present participle of the entry, and a field 25 for storing a Japanese translation of the entry 18.

In an example illustrated in FIG. 5, since word "a" does not have a variant, fields 20–24 are blank. If inflexion field 20 is blank, it indicates that the word does not change, "0" indicates that the word undergoes an irregular change which does not belong to any regular inflexion pattern, and the other values indicate that it changes in accordance with a specified regular inflexion pattern.

Now, referring to FIGS. 3–10, an operation of English-Japanese translation performed by the translating machine in accordance with the embodiment will be described. A translation program executed in translation CPU 15 will later be described in detail.

Figures 6, 7, 8:
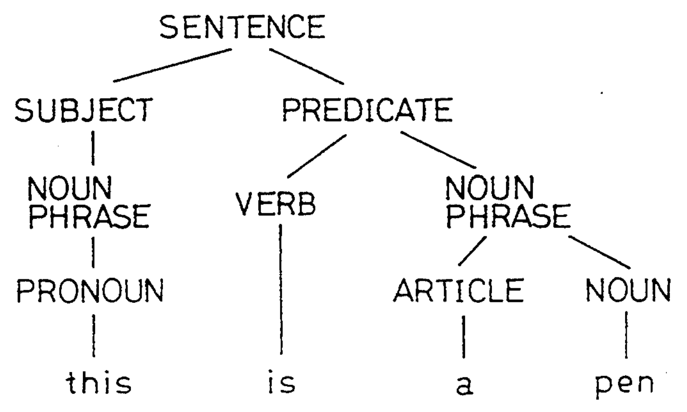
FIGS. 6–10 are representations schematically showing the storage contents of buffers A, B, C, D, and E, respectively.

A read original is decomposed into morphemes by a morphologic analyzing, and stored in buffer A (see FIG. 4) as illustrated in FIG. 6.

Then, information such as the translation and part of speech information of each word is provided for each word in the original sentence stored in buffer A by dictionary look up/morphologic analyzing portion 11 illustrated in FIG. 2 under the control of translation CPU 15 based on the translation program 16, by referring to dictionary 17 (see FIG. 5) stored in memory 6. This information is stored in buffer B illustrated in FIG. 4. As a part of the information, the part of speech information on each word is included, and the part of speech information is stored as illustrated in FIG. 7. More specifically, "this", for example, can serve as two different parts of speech, pronoun and demonstrative adjective. The part of speech of "is" is verb. Similarly, the parts of speech of "a" and "pen" are stored in buffer B. The word has "This" can serve as plural parts of speech, and which part of speech is employed in the sentence is uniquely decided by a processing in syntactic analyzing portion 12, illustrated in FIG. 2.

In syntactic analyzing portion 12 (illustrated in FIG. 2), a parsing tree showing the relation between words is decided as illustrated in FIG. 8, for example, based on the dictionary and the grammatical rules stored in memory 6. The result of syntactic analyzing is stored in buffer C in FIG. 4.

The parsing tree is decided as follows. Among the grammatical rules stored in memory 6, grammatical rules related to English includes the following elements.

[Table 1]

Sentence →Subject, Predicate
Subject→Noun phrase
Predicate→Verb, Noun phrase
Noun phrase→Pronoun
Noun phrase→Article, Noun Among the above rules, the first rule indicates that "the sentence is formed of a subject and a predicate". The same applies to the other rules. The structure analyzing tree is decided based on these rules. Such grammatical rules are also prepared for Japanese, and correspondence is preestablished between the English grammatical rules and the Japanese grammatical rules.

Figures 9, 10:
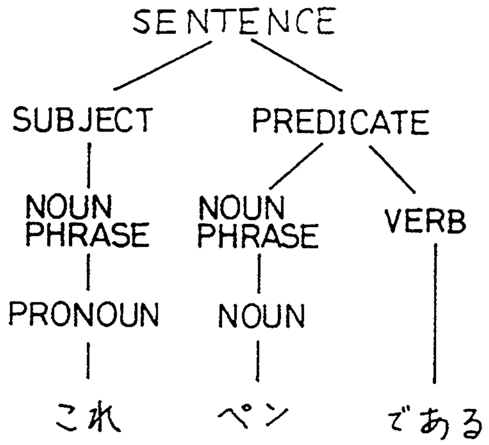

Among the translation program, in transformation portion 13 (illustrated in FIG. 2), the structure of the parsing tree (see FIG. 8) of an input English sentence is transformed into the structure of a parsing tree corresponding to a Japanese sentence illustrated in FIG. 9. In this transformation, as is the case with the above-stated syntactic analyzing portion 12, "tree structure transformation rules" stored in memory 6 are used. This transformation corresponds to transformation from the level L3 to the level L9 of the target language in FIG. 1. The result is stored in buffer D. The example sentence used in the description "this is a pen" will be converted into a Japanese character string "これ ペン である" by this conversion.

Among, the portion corresponding to translation producing portion 14 in FIG. 2, an appropriate particle "は" or an auxiliary verb is added to the resultant Japanese character string "これ ペン である" to form a grammatical Japanese sentence as shown in FIG. 10, and the same is stored in buffer E (illustrated in FIG. 4). This processing corresponds to conversion from level L9 to level L10. The resultant Japanese sentence "これはペンである." is output from translation module 5 (illustrated in FIG. 4), stored in main memory 2 and displayed in display unit 3.

If a word which is not stored in dictionary 17 (shown in FIG. 5) is included in an input English sentence, a morphologic analyzing performed in the stage of level L2 in FIG. 1 among the translation processing can not be normally executed. The user dictionary prestores such a word and permits a morphologic analyzing processing to be executed normally. More specifically, in order to provide a good translation result, words included in a sentence to be translated but not registered in the dictionary 17 of memory 6 should be registered in the user dictionary in advance.

Referring to FIGS. 11–30, an operation of a translating machine and user operation when a phrase including irregular inflexion is registered in a user dictionary in a translating machine as one example of the language processing apparatus in accordance with the present invention will be described.

Figure 11:
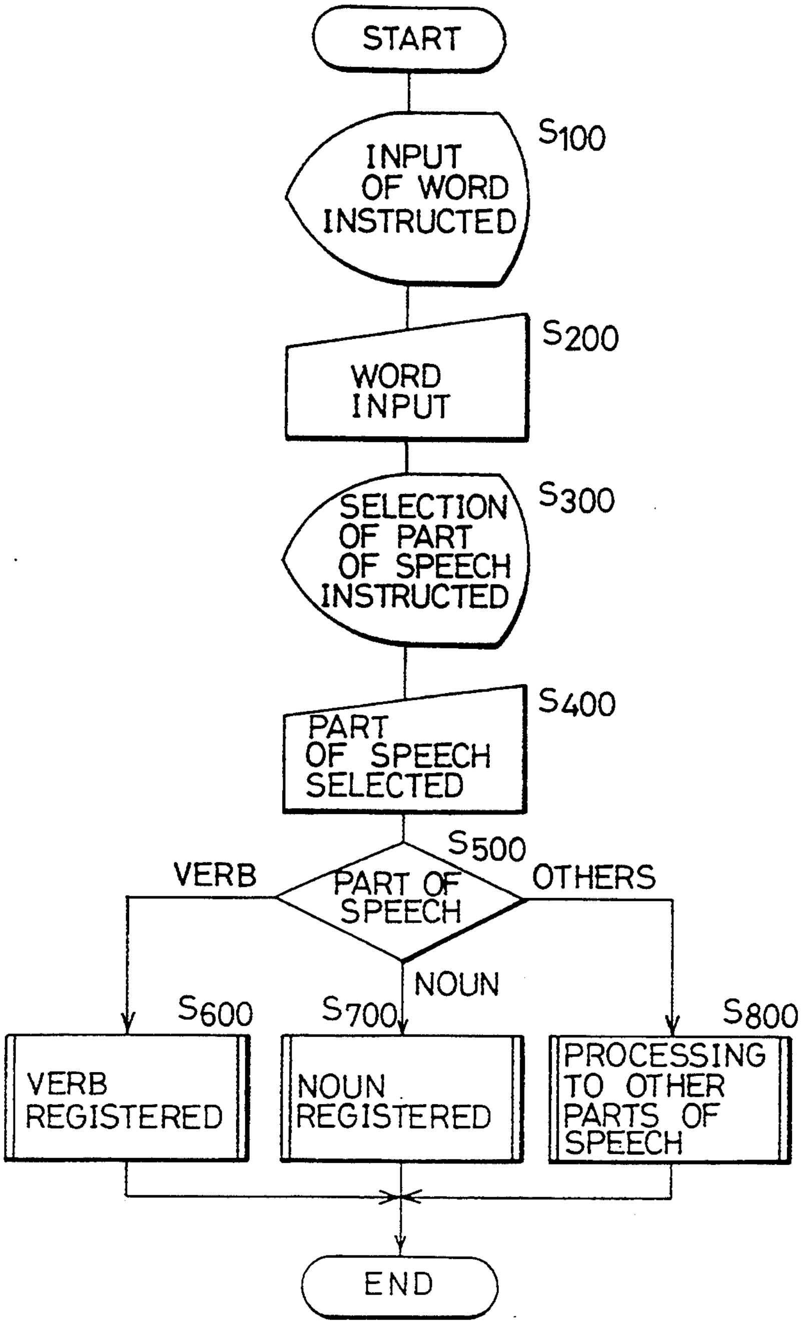
FIG. 11 is a flow chart showing a main routine in a translation program executed in a translation module.

FIG. 11 is a flow chart showing the user dictionary registration processing. In FIG. 11, the portion which is not directly relevant to the invention and covers a plurality of procedures is illustrated as one block. The portion related to the invention will be described in detail in conjunction with the other drawings. In the following description, it is assumed that a processing is performed utilizing the apparatus illustrated in FIGS. 3 and 4.

When a function of user dictionary registration is initiated, a message instructing input of the entry of a word to be registered is displayed in display unit 3 in step S (hereinafter simply as "S") 100, and input via keyboard 4 is allowed. Then, in S200, the user inputs a word which he desires to register. The input word is stored in buffer F. In S300, a list of parts of speech which can be registered in the user dictionary is displayed in display unit 3, and a message asking the user to select a part of speech is displayed in display unit 3. Input via keyboard 4 then is allowed. In S400, the user selects the part of speech of the input word utilizing keyboard 4.

In S500, the processing branches to S600, S700, and S800 depending upon the selected part of speech being verb, noun or another part of speech. A processing in S800 among these processings is simpler than other ones, therefore the description thereof will be omitted, and a verb registration processing in S600 and a noun registration processing in S700 will be described in detail.

Figure 12:
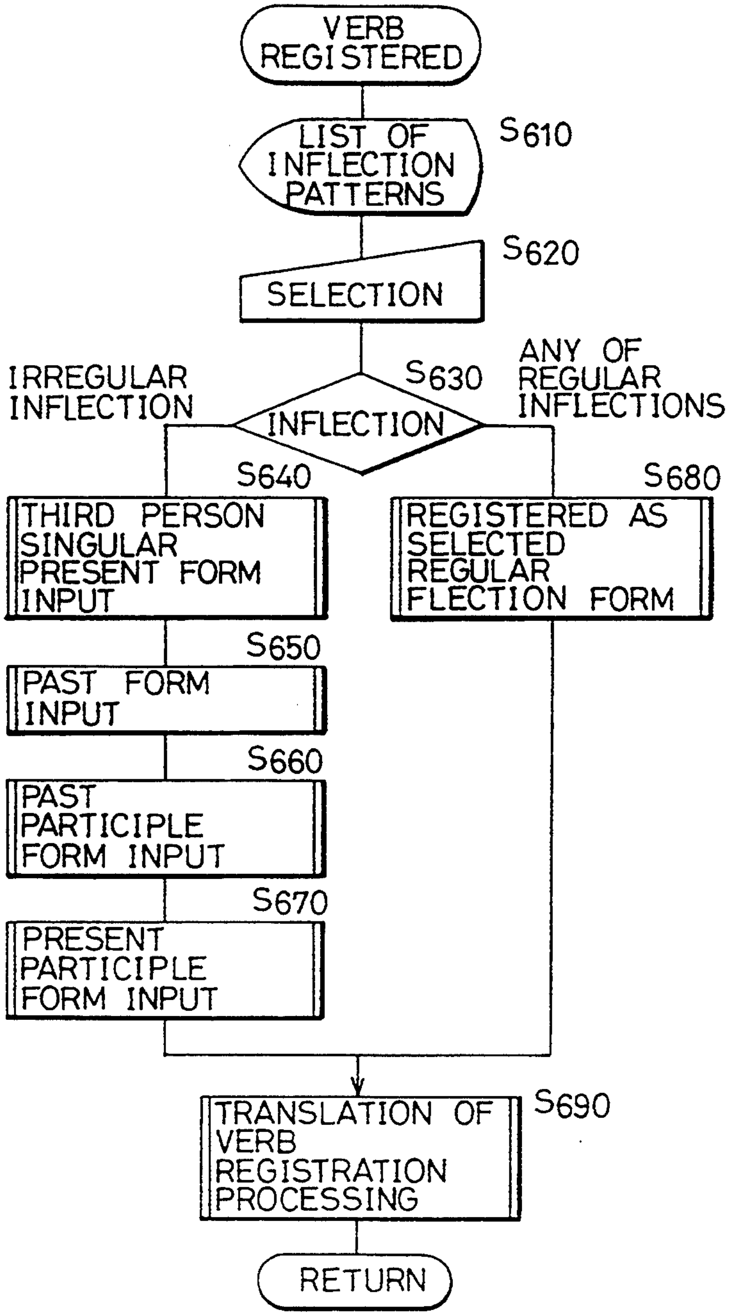
FIG. 12 is a flow chart showing a verb registration processing.

If the selected part of speech in S400 is verb, a verb registration processing is initiated. In the following, assume that a word which the user desires to register is "forget", and an operation of the translating machine and a user operation in registration thereof will be described. Referring to FIG. 12, in S610, a list of inflection patterns for verb is displayed in the display unit. Information as to the list of inflection patterns for verb is prepared, for example, as a table in the translation program 16 in FIG. 4. One example of the list of inflection patterns for verb displayed in display unit 3 is illustrated in FIG. 16.

Figures 15, 16, 17:
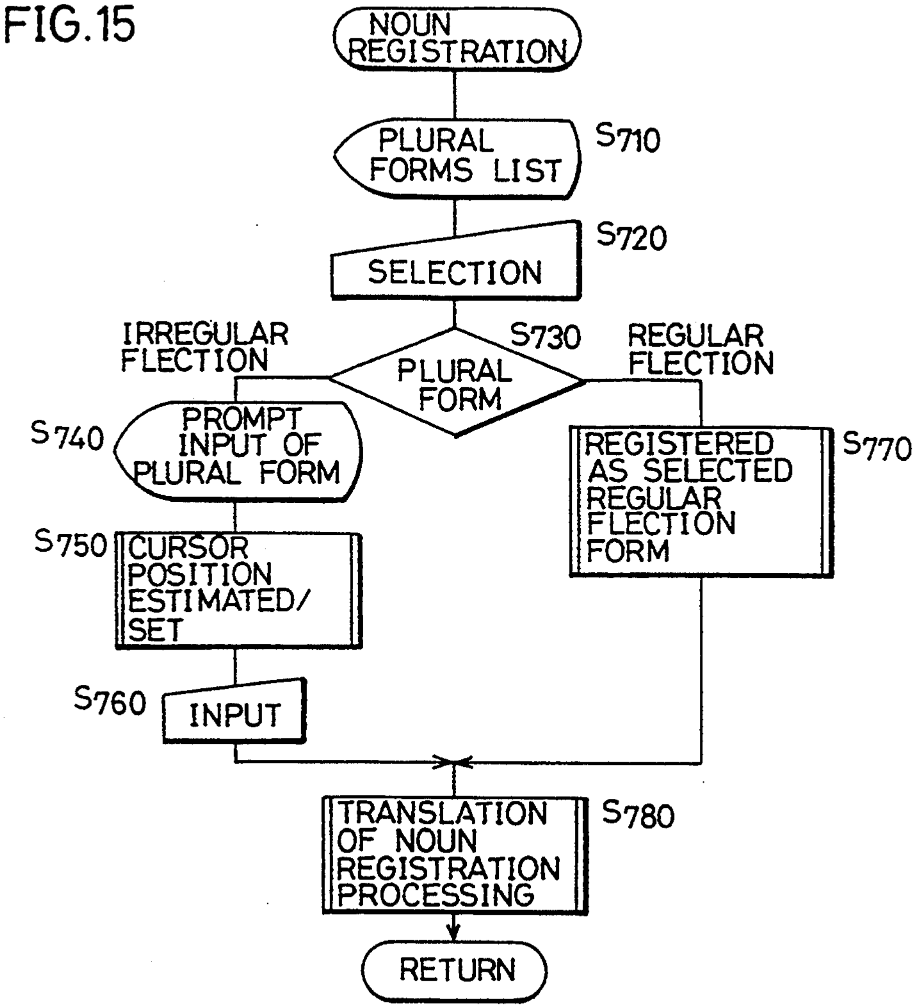

Referring to FIG. 16, six regular patterns are prepared as the inflection patterns. For example, the first inflection pattern illustrated in FIG. 16 is the most common pattern. In the second inflection pattern, when the past, past participle and present participle forms are produced, these variants are produced by adding "ed", "ed", and "ing", respectively after removing the last letter of the original "e". In the third inflection pattern, when the past, past participle, and present participle forms are produced, after repeating the last one letter of the original "ed", "ed", and "ing" are added, respectively. The fourth inflection pattern is similar to the first pattern but is different from the first pattern in that "es" is attached to the end of the original when the third person singular, present form is produced. The fifth pattern concerns a word whose original ends with "y". In this pattern, "ies", "ied", and "ied" are attached after removing "y" at the end of the original, when the third person singular present, past, and past participle forms are produced. When the present participle form is produced, a variant pattern of simply attaching "ing" is adopted. In the sixth pattern (as opposed to any of the above-stated first to fifth patterns,) when the third person singular present form is produced, the original is attached with "s". In the case of the past form, the original is unchanged; when the past participle form is produced, the original is attached with "en" at the end; and, and when the present participle form is produced, "ing" is attached at the end of the original. In the case of a pattern which does not belong to any of the first to sixth variant patterns, it is predetermined to select "0" in the box illustrated in FIG. 16.

Within the box illustrated in FIG. 16 is a cursor waiting at the end of an indication "SELECT FLECTION PATTERN". Numbers attached to choices can be input by the user.

Then, the processing proceeds to S620, and the user inputs a number corresponding to the inflection pattern utilizing keyboard 4 (see FIG. 3). Since the verb "forget" to be registered does not belong to any of the first to sixth patterns, "0" is input in S620. The processing then proceeds to S630.

In S630, the processing branches depending upon the selected number. If the input choice belongs to any of the first to sixth patterns, the presently input word changes in accordance with the specified pattern. Based on the specified pattern, a variant can be produced from the original in the sentence and, therefore, information indicating the word is a verb and only information on which variant pattern the word belongs to are necessary as information to be stored in dictionary 17 (see FIG. 5). Accordingly, in S680, the word is registered in the dictionary as the selected regular variant. The processing then proceeds to S690.

If the inflection pattern input in S620 is "0", the processing proceeds to S640. The word used in the present explanation "forget" undergoes an irregular change and therefore the processing moves to S640 and after. In S640, S650, S660, and S670, the third person singular present, past, past participle, and present participle forms of the word are input. Cursor control when inputting them is one of the characteristic features of the present invention.

In step S640 and after a processing of inputting the third person singular present form is performed. Referring to FIG. 17, the original form of the word input in S200 is displayed together with a message asking to input the third person singular present form. The region in which the word is displayed is an input region for inputting a variant of the third person singular present. It is a first characteristic of the translating machine in accordance with the present invention that the cursor stands by at the end of the spelling of the displayed original at that time. This is because attaching "s" or the like to the end of the original is most likely when a variant form of third person singular present for an English word is produced. Since the cursor stands by at the end of the spelling of the displayed original as described above, the user can input the variant of third person singular present form without having to input its entire spelling, by simply modifying the part different from the spelling of the displayed original with a minimum labor. In the case of this word of the example, as illustrated in FIG. 18, the third person singular present form can be input by attaching "s" at the end of displayed "forget", in other words the present cursor position.

Figure 13:
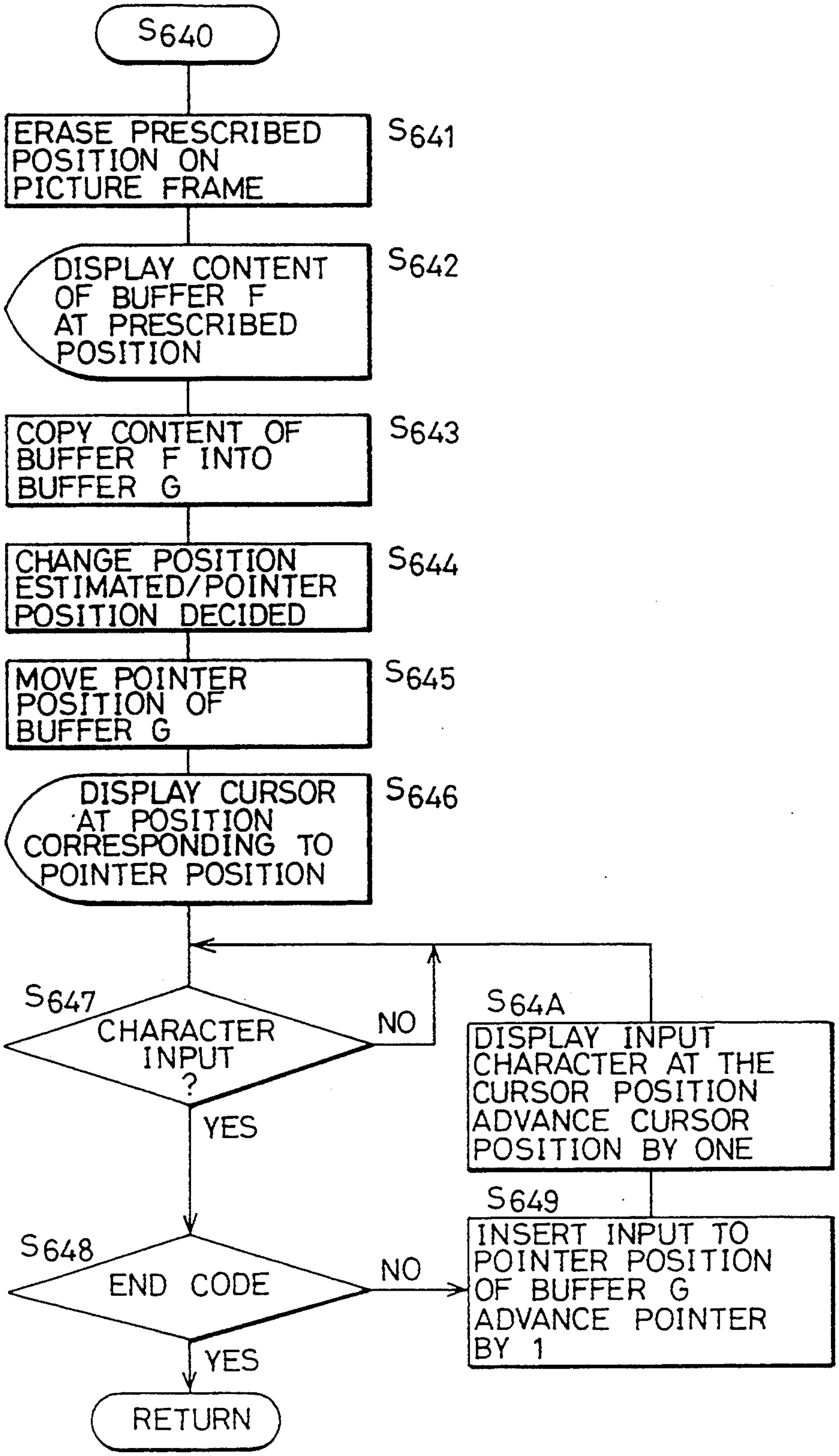
FIG. 13 is a flow chart showing in detail a third person singular present tense input processing.

The third person singular present form input in S640 in FIG. 12 is performed as follows. Referring to FIG. 13, a processing of erasing a prescribed position in the picture frame of display unit 3 is performed in S641. This prescribed position is an input region and also the position for displaying the original of the already input word.

Then in S642, the input word or phrase which has been stored in buffer F is displayed at the erased prescribed position in the picture frame. The state of the picture frame at that time is as illustrated in FIG. 17, but the cursor is not displayed at this moment. Positioning of the cursor is executed in a process in the following S643 and after.

In S643, a processing of copying the stored content of buffer F into buffer G is performed. Buffer G is for storing variants of words. Prestoring the originals of input words in buffer G as described above permits the contents of buffer G to be modified as is the case with modification in the picture frame.

In S644, the highest possible position at which the original of the word displayed in the picture frame is different from its variant is estimated from the already designated part of speech information and information on characters stored in buffer G, based on the grammatical rules of the knowledge base stored in memory 6. Based on the result of estimation, the position to set the pointer of buffer G is decided. In the case of the present embodiment, the language to be dealt with is English and this part will be later described in more detail in conjunction with FIG. 14.

Then, in S645, the pointer of buffer G is moved to the position decided by the processing in S644.

In S646, the cursor is displayed at the position in the picture frame of display unit 3 which corresponds to the position designated by the pointer in buffer G. Thus, the result of display in the picture frame will be as shown in FIG. 17.

In S647, a determination is made as to whether or not a character is input. If a character is input, the processing proceeds to a processing in S648, but if there is not any character input, the processing in S647 is repeated, and a waiting processing is performed until a character is input.

If there is a character input, the processing proceeds to S648, and a determination is made as to whether or not the input character is a code indicating the end of input (end code). If it is the end code, this means input of its variants is also completed, and therefore the processing returns to the main routine. If it is not the end code, that means the form of variant is modified, and therefore the processing proceeds to S649.

In S649, a processing of inserting the character input in S647 to the position designated by the pointer in buffer G is made. The pointer of buffer G is advanced by one.

Then in S649, a processing of displaying the input character at the position of the cursor displayed in S646 is executed, and a processing of moving the cursor to the position advanced by one from the position displayed in S646 is performed. After S64A, the processing returns to S647.

The processings in S647-S64A are repeated, and a necessary number of characters are modified.

Figure 14:
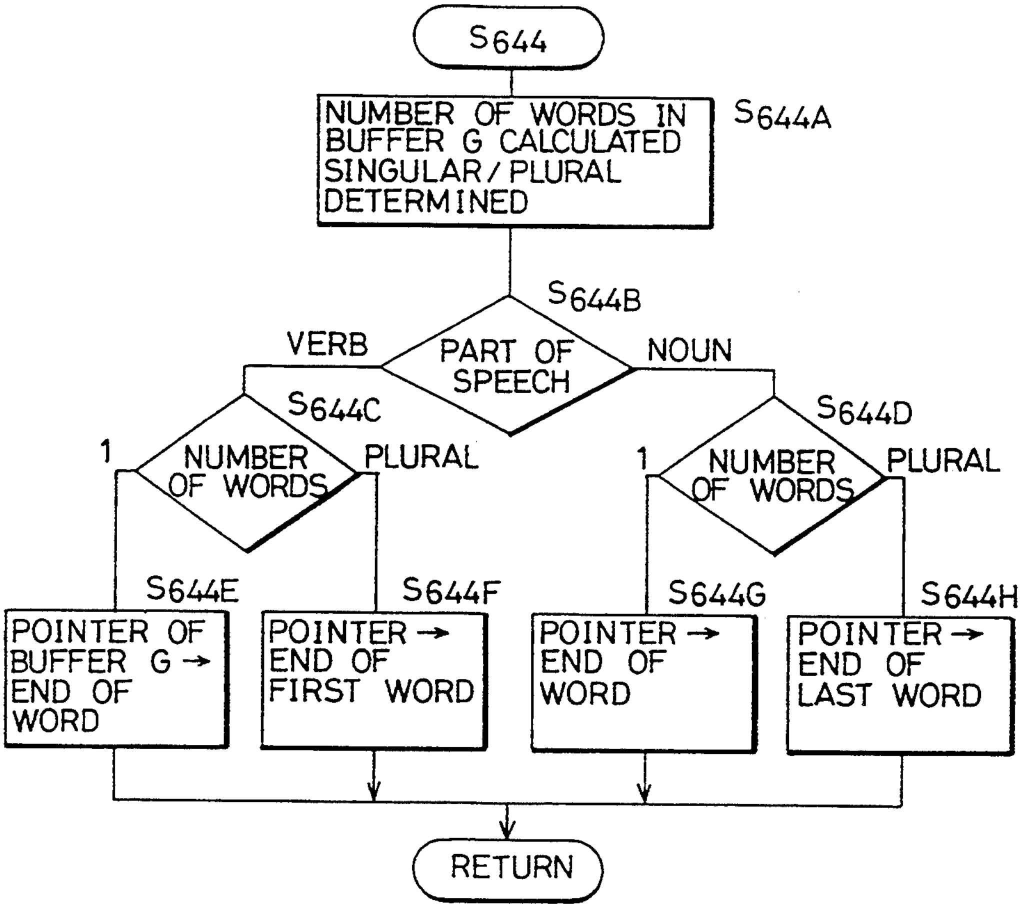
FIG. 14 is a flow chart showing in detail a variant position estimation/pointer position determination processing.

Referring to FIG. 14, the content of the processing in S644 which is limited to processing to English words will be as follows. It is noted that the processing routine shown in FIG. 14 is made applicable both when a word to be processed is a verb and a noun. Therefore, S644 is applicable not only to S640 in FIG. 12 but also to S650, S660, and S670 and can be used to S750 in FIG. 15 at the time of noun registration which will be described later.

In S644A, a processing of calculating the number of words stored in buffer G is performed. Then a determination is made whether the obtained number of words is one or a plurality.

In S644B, a determination is made as to whether the part of speech of the word or phrase stored in buffer G (selected in S400 in FIG. 11) is a verb or a noun. If the part of speech is a verb, the processing proceeds to S644C, and if it is noun, the processing proceeds to S644D.

If the part of speech is a verb, the processing proceeds to S644C, and if it is a noun, the processing proceeds to S644D.

If the part of speech is a verb, in S644C, a determination is made as to whether the number of words calculated in S644A is one or plural. If it is one, the processing proceeds to S644E and, otherwise, the processing proceeds to S644F.

In S644E, in the case of an English verb (formed of a single word), there is the highest possibility that its variant is formed by attaching some suffix to the end of the original, and therefore the pointer of buffer G is set at the end of the word.

If the number of words is plural, the pointer is set at the end of the first word of the plurality of words. This is because in the case of a compound verb, there is the highest possibility that the head word is a verb and changes its form and that a suffix will be attached to the end of the head word.

Meanwhile, if the part of speech is determined to be a noun in S644B, the processing proceeds to S644D, and a determination is made as to whether or not the number of words calculated in S644A is one or plural. If the result of the determination indicates that the number of words is one, the processing proceeds to S644G, and otherwise the processing proceeds to S644H.

If the number of words is one, in S644G, the pointer of buffer G is determined to be set at the end of the word. This is because, although there are plurality of forms as variants of English nouns, attaching a suffix such as a small letter "s" at the end of the original of a noun of a single word is most likely when its plural form is produced for the noun.

Meanwhile, if the number of words is plural, the processing proceeds to S644H, and the pointer of buffer G is set at the end of last word of a phrasal noun in buffer G. This is because, as opposed to verbs, in the case of a phrasal noun in English, a noun often comes at the end and the word at the end is most likely to be changed into a plural form when the entire word is made plural. In such a case, there is a high possibility that a suffix is attached to the end of the last word. This is why the pointer is set at the end of the last word of a phrasal noun.

After S644E, S644F, S644G and S644H, the processing returns to S645 in FIG. 13.

In S650, an input processing for a past form is similarly performed. Also in this case, the original is displayed as illustrated in FIG. 19, and the cursor stands by at the end of the original. This is because, when the past form of an English word is produced, attaching "ed" to the end of the original of the verb is most likely. In the case of the word of the example, as illustrated in FIG. 20, the cursor is moved back by two letters and "e" is changed into "o", thereby completing input of the past form. In most cases of other verbs, the originals of the verbs need only be attached with "ed", and in such a case input of the past form can be made more efficiently than the case of the above-stated word.

In S660, the past participle form is input in a similar manner. When the past participle form is input, as illustrated in FIG. 20, the original form of the verb is displayed, and the cursor stands by at the end of the original. This is because in the case of an English verb, when the past participle form is produced attaching some suffix to the end of the original of the verb is most likely as with the past form. In the case of word of the example, as illustrated in FIG. 21, "e" is changed into "o" and "ten" is attached to the end of the word, thereby completing input of the past participle form.

In S670, the present participle form is input. As illustrated in FIG. 23, the original form of the verb is displayed as well as a message asking to input the present participle form. Also in this case, the cursor is positioned at the end of the original of the verb. This is because, in the case of the present participle form of an English word, a suffix such as "ing" is attached to the original form of the verb in many cases. In the case of the word of the example, as illustrated in FIG. 24, "t" at the end of the word is repeated and "ing" is simply attached thereto. Thus, with the cursor standing by at the end of the original, the present participle form can be input with the minimum labor.

Since the variants of the verb are all input in the above-stated manner, the processing proceeds to S690. In S690, the user inputs information necessary for registering the word into dictionary 17 (see FIG. 5) such as a translation both in the cases of irregular change and regular change, and when all the necessary information is input, the word is registered as a new item in dictionary 17, thereby completing the function of user dictionary registration.

(2) Registration of Noun

Meanwhile, a noun registration processing in S700 in FIG. 11 is executed as follows. In the following description, word "child" is to be registered.

Referring to FIG. 15, in S710, a list of the plural forms of nouns is displayed on display unit 3 (see FIG. 3). The list of the plural forms of nouns is prepared as the table in translation program 16 (see FIG. 4). One example of the displayed picture frame of the list of the plural forms of nouns is illustrated in FIG. 25. Referring to FIG. 25, there are five regular flection patterns for the plural forms of nouns prepared. In the first pattern, "s" is simply attached to the end of the word, which is the most common. In the second pattern, "es" is attached to the end of the original of the word. This is applied when the noun ends with a particular pronunciation. The third pattern is for the original of a noun which ends with "y". In this pattern, "ies" is attached to the end of the word after removing "y". The fourth pattern is for the word whose plural form is the same as the singular form. The fifth pattern is for the word with no plural form. The case which does not belong to any of these first to fifth regular patterns is allotted with number "0". The message "SELECT" is in the box in this case, and the cursor stands by at the end of the word. The numbers of choices displayed can be input. The plural form of the noun "child" to be registered now is irregular, and therefore "0" is input in the box displayed in FIG. 25.

Referring back to FIG. 15, in S730, the processing branches depending upon whether the plural form of the noun to be registered follows an irregular pattern or a regular pattern in response to the choice selected in S720. In the case of a regular pattern, in other words the selected choice in S720 is among 1–5, the processing proceeds to S770, and the part of speech ("noun") and a number previously allotted to the pattern will be registered as a selected regular variant. The processing after S770 proceeds to S780.

Meanwhile, if the word to be registered undergoes irregular change, the processing proceeds to S740. In the case of the word of the example, the processing will proceed to S740. In S740, as illustrated in FIG. 26, a message asking to input the plural form together with the original form "child" input in S200 (see FIG. 11) is displayed on display unit 3 (see FIG. 3). In S750, at which position of the displayed word the cursor should be set and the position with the highest possibility that the original form is different from the plural form when the plural form is produced are estimated, and the cursor is set to the position. In the case of the plural form of a noun, as illustrated in FIG. 25, a suffix representing the plural form is often attached to the end of the original. Accordingly in S750, the cursor position is decided at the end of the word, and the cursor is placed there.

In S760, the plural form is input by the user. In the case of the word of the example "child", the plural form is produced by attaching "ren" to the end of the word, simply inputting "ren" without changing the cursor position completes input of the plural form.

As described above, in the case of inputting the plural form of a noun which is produced based on an irregular pattern, the user does not have to input the entire spelling, and can input the plural form with slight modification. After the processing in S760 is completed, the processing proceeds to S780. The processings in S740–S760 can be implemented using the routine shown in FIGS. 13 and 14 as they are in the case of a verb.

When any of the processings in S760 and S770 is completed, the processing proceeds to S780, and in S780, the user inputs a translation of a word to be registered and other necessary information. When all the necessary information is input, the word is registered as a new item in dictionary 17 (see FIG. 5), thus completing the function of user dictionary registration.

In the case of processing the other parts of speech in S800, variants in the case of verbs and nouns are not usually included, and therefore their registration to the dictionary can be achieved by simpler processings. Accordingly, these processings will not be described in detail. In the following, alleviation of the labor needed when a phrasal expression is registered (a problem in the prior art) will be described.

(3) Registration of Phrasal Verb

Hereinafter, registration of the phrasal verb "come about" as a verb will be described. When the user dictionary registration is initiated, the same processing as (1) Registration of Verb is performed as far as S400 in FIG. 11. In this case, it is the above-stated phrasal verb that is input, not a word. In S500, since the selected part of speech is verb, the processing proceeds to S600.

Referring to FIG. 12, in S610 a list of flection of verbs similar to the one shown in FIG. 16 is displayed in display unit 3 (see FIG. 3).

In S620, a flection form is selected. When the phrasal verb "come about" is taken as one verb, the part "come" actually changes. And "come" itself changes irregularly. Therefore in S620, the user selects "0" in FIG. 16 since the entire phrasal verb irregularly changes. In S630, it is determined that the irregular change is selected and the processing proceeds to S640.

In S640, as shown in FIG. 28, a message asking to input the third person singular present form is displayed, and the original form "come about" is displayed as well. In FIG. 28, the cursor position is controlled at the end of "come" rather than the end of the entire phrasal verb "come about". This is for the following reason. In English, when a phrasal verb is treated as a verb, among the words constituting the phrasal verb, the head word is most likely to undergo change. This is because a verb comes at the head of a phrasal verb in most cases. Taking into account this linguistic characteristic, the cursor is positioned at the end of the first word in registering an English phrasal verb. This is a second characteristic of the present invention.

In the case of this example, as illustrated in FIG. 29, by attaching "s" to the end of the first word "come", the third person singular present form of the phrasal verb can be input. The variant can be input with a reduced movement of the cursor and a reduced amount of modification as compared to the case in which the cursor is positioned at the head of the input region or at the end of the phrasal verb.

In S650, initially "come about" is displayed on display unit 3, and then the cursor is positioned at the end of "come". The user modifies "come" into "came", thereby completing input of the past form.

In S660, "come about" is displayed on the display unit, and the cursor is positioned at the end of "come". In this case, since the past participle form is the same as the original, input of the past participle form is completed by simply pressing an input end key without any modification.

In S670, initially "come about" is displayed on the display unit, and the cursor is positioned at the end of "come". In this case, "come" is modified into "coming" and the present participle form is input.

Since input of the phrasal verb "come about" is thus completed, the processing proceeds to S690, and a translation and other necessary information are input. When all the necessary information is input, the phrasal verb is registered as a new item in dictionary 17 (see FIG. 5), thereby completing the function of user dictionary registration. The processings in S640–S670 can be achieved by the routine shown in FIG. 13 and 14.

(4) Registration of Phrasal Noun

Registration of the phrasal noun "street child" as a noun will be described. Referring to FIG. 11, after initiation of a function of user dictionary registration, processings in S100–S400 are the same as those executed in (2). However, in this case, the word to be input "street child" in S200 is different from that of (2). Depending upon the result of determination in S500, the processing proceeds to S700 as with (2).

Referring to FIG. 15, in S710, a list of the plural forms of nouns is displayed on the display unit as shown in FIG. 25. At the same time, the user is asked to select any of the numbers allotted to the flection patterns of plural forms.

In S720, the user inputs a number corresponding to the pattern of the plural form of the phrasal noun "street child". When the phrasal noun is taken as one noun, only the part "child" actually changes. Since the plural form of the part undergoes irregular change, the number to be selected in S720 is "0".

As a result, depending upon the result of determination in S730, the processing proceeds to S740.

In S740, initially, as illustrated in FIG. 30, a message asking for input of the plural form is displayed, as well as the original form of the phrasal noun input in S200 (see FIG. 11). In this case, the cursor is positioned at the end of the entire phrasal noun "street child" in other words, at the end of "child". This is for the following reason. In English, when the phrasal noun as a whole is treated as a noun, only the word at the end of the words constituting the phrasal noun is likely to undergo change when the phrasal noun is made plural. This is because the noun deciding the nature of the entire phrasal noun is positioned at the end of the phrasal noun in most cases. Taking into account (this linguistic characteristic, when the plural form of the phrasal noun is input, the cursor is set at the end of the phrasal noun.

In this case, as illustrated in FIG. 31, the user attaches "ren" to the end of the phrasal noun, in other words to the end of "child" and presses the input end key, thereby completing input of the plural form "street children" in S760.

Since input of the plural form of the phrasal noun "street child" is completed, the processing proceeds to S780. In S780, the user inputs a translation of the phrasal noun and other necessary information. When all the necessary information is input, the phrasal noun is registered as a new item in dictionary 17 (see FIG. 5) and the function of user dictionary registration is completed. It is noted that the input processing in this case can also be implemented utilizing the routine in FIGS. 13 and 14.

As in the foregoing, in the language processing apparatus in accordance with the present invention, words which change irregularly and the flection and plural forms of phrasal expressions are registered in the dictionary as follows. First, the spelling of a first form of a word or a phrasal expression to be registered is displayed in an input region. An input position is set at the position where the first form and a second form are most likely to be different. Accordingly, the amount of changing of the input position is minimized. Furthermore, generally, the second form can be input by only slightly changing the displayed first form.

Consequently, the language processing apparatus of the invention minimizes the labor of dictionary registration.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A language processing apparatus, comprising:

means for performing a grammatical processing including at least morphological analysis to a sentence in a prescribed first language to be input;

a dictionary useable at the time of morphologic analysis and stored in a machine-readable storage medium in a machine readable manner for storing morphemes in said first language; and means for aiding a user in producing a part of said dictionary, said dictionary producing aiding means including:

means for obtaining a first form of a target morpheme which the user desires to have said dictionary store;

means for receiving a second form of said target morpheme input by the user from a prescribed input region;

manually operable input means for editing, at an input position which can be moved, a character string displayed on said prescribed input region;

means for displaying said first form on said prescribed input region and positioning a cursor indicating the input position at a character location with the highest estimated possibility that said first form and said second form are different, prior to receiving said second form; and means for storing said first form and said second form in association with each other into said use dictionary.

2. A language processing apparatus as recited in claim 1, wherein said means for positioning the input position includes means for displaying said first form on said input region, means for specifying a part of speech categorizing said target morpheme, means for estimating a location with the highest estimated possibility that the form of said second morpheme is different from the form of said first morpheme depending upon the kind of said specified part of speech, and means for positioning the input position to a corresponding position on said input region based on the result of the estimation by said estimation means.

3. A language processing apparatus as recited in claim 2, wherein said means for specifying a part of speech categorizing said target morpheme include, means for displaying a list of available parts of speech, and means for permitting the user to select one part of speech from said list.

4. A language processing apparatus as recited in claim 3, wherein said first language is English.

5. A language processing apparatus as recited in claim 4, wherein said available parts of speech include noun and verb, and said estimate means includes means for estimating a location at which said second form is different from said first form, when said target morpheme is verb, and means for estimating a location at which said second form is different from said form when said target morpheme is noun.

6. A language processing apparatus as recited in claim 5, wherein said available parts of speech further include a phrasal expression formed of a plurality of morphemes, said phrasal expression includes a phrasal verb equivalent to a verb, and a phrasal noun equivalent to a noun, said means for positioning the input position further includes means for determining whether or not said first form is a phrasal expression, and said estimate means further includes means, when said first form is determined to be a phrasal expression, for determining whether the phrasal expression is a phrasal verb or a phrasal noun, means, when said target morpheme is a phrasal verb, for estimating a location at which said second form is different from said first form, and means for estimating, when said target morpheme is a phrasal noun, a location at which said second form is different from said first form.

7. A language processing apparatus as recited in claim 5, wherein said means for estimating a location at which said second form is different from said first form when said target morpheme is a verb, includes means for estimating the head location at which said second form is different from said first form.

8. A language processing apparatus as recited in claim 7, wherein said means for estimating a location at which said second form is different from said first form, when said target morpheme is a noun, includes means for estimating the head position at which said second form is different from said first form.

9. A language processing apparatus as recited in claim 5, wherein said means for estimating a location at which second form is different from said first form, when said target morpheme is a noun, includes means for estimating the head position at which said second form is different from said first form.

10. An apparatus for aiding a user in producing a part of a dictionary stored in a machine-readable storage medium in a machine readable manner for storing morphemes in a prescribed language, comprising:

means for obtaining a first form of a target morpheme which the user desires to have said dictionary store;

means for receiving a second form of said target morpheme input by the user from a prescribed input region;

manually operable input means for editing, at a input position that can be moved by the operator changing the cursor position, a character string displayed on said prescribed input region, means for displaying said first form on said prescribed input region and positioning the cursor at a character location in said first form with the highest estimated possibility that said first form and said second form are different from each other; and means for storing said first form and said second form in association with each other in said user dictionary.

11. A dictionary production aiding apparatus as recited in claim 10, wherein said means for positioning the input position includes means for displaying said first form on said input region, means for specifying a part of speech categorizing said target morpheme, means for estimating a location with the highest estimated possibility that the form of said second morpheme is different from the form of said first morpheme depending upon the kind of said specified part of speech, and means for positioning the input position at a corresponding position on said input region based on the result of estimation by said estimation means.

12. A dictionary production aiding apparatus as recited in claim 11, wherein said means for specifying a part of speech categorizing said target morpheme includes means for displaying a list of available parts of speech, and means for allowing the user to select one part of speech from said list.

13. A dictionary production aiding apparatus as recited in claim 12, wherein said first language is English.

14. A dictionary producing aiding apparatus as recited in claim 13, wherein said available parts of speech include noun and verb, and said estimate means includes means for estimating a location at which said second form is different from said first form, when said target morpheme is a verb, and means for estimating a location at which said second form is different from said first form, when said target morpheme is a noun.

15. A dictionary production aiding apparatus as recited in claim 14, wherein said available parts of speech further include a phrasal expression formed of a plurality of morphemes, said phrasal expression word includes a phrasal verb equivalent to a verb, and a phrasal noun equivalent to a noun, said means for positioning the input position further includes means for determining whether or not said first form is a phrasal expression, and said estimate means further includes means, when said first form is determined to be a phrasal expression, for determining whether the phrasal expression is a phrasal verb or a phrasal noun, means, when said target morpheme is a phrasal verb, for estimating a location at which said second form is different from said first form, and means, when said target morpheme is a phrasal noun, for estimating a location at which said second form is different from said first form.

16. A dictionary production aiding apparatus as recited in claim 14, wherein said means for estimating a location at which said second form is different from said first form when said target morpheme is a verb includes means for estimating the head position at which said second form is different form said first form.

17. A dictionary production aiding apparatus as recited in claim 16, wherein said means for estimating a location at which said second form is different from said first form when said target morpheme is a noun includes means for estimating the head position at which said second form is different from said first form.

18. A dictionary production aiding apparatus as recited in claim 14, wherein said means for estimating a location at which said second form is different form said first form when said target morpheme is a noun includes means for estimating the head position at which said second form is different from said first form.

* * * * *